United States Patent
Mocioiu et al.

(10) Patent No.: US 11,695,546 B2
(45) Date of Patent: Jul. 4, 2023

(54) DECOUPLED CUSTOM EVENT SYSTEM BASED ON EPHEMERAL TOKENS FOR ENABLING SECURE CUSTOM SERVICES ON A DIGITAL AUDIO STREAM

(71) Applicant: AdsWizz Inc., San Mateo, CA (US)

(72) Inventors: Victor Mocioiu, Bucharest (RO); Bruno Nieuwenhuys, Sunnyvale, CA (US); Vlad Andrei Dumitru, Bucharest (RO); Guillaume Drevet, Bucharest (RO)

(73) Assignee: ADSWIZZ INC., San Mateo, CA (US)

( * ) Notice: Subject to any disclaimer, the term of this patent is extended or adjusted under 35 U.S.C. 154(b) by 78 days.

(21) Appl. No.: 16/889,563

(22) Filed: Jun. 1, 2020

(65) Prior Publication Data

US 2020/0382275 A1 Dec. 3, 2020

(30) Foreign Application Priority Data

May 30, 2019 (EP) .................................. 19464009

(51) Int. Cl.
| H04L 29/06 | (2006.01) |
| H04L 9/06 | (2006.01) |
| G06F 21/62 | (2013.01) |
| H04L 9/32 | (2006.01) |

(52) U.S. Cl.
CPC .......... *H04L 9/065* (2013.01); *G06F 21/6263* (2013.01); *H04L 9/0643* (2013.01); *H04L 9/3297* (2013.01)

(58) Field of Classification Search
None
See application file for complete search history.

(56) References Cited

U.S. PATENT DOCUMENTS

| 8,694,775 | B2 * | 4/2014 | Hui ..................... H04W 12/037 |
| | | | 713/160 |
| 9,525,897 | B2 * | 12/2016 | Meembat ......... H04N 21/23424 |
| 10,051,327 | B1 * | 8/2018 | Nieuwenhuys .... H04N 21/8456 |
| 10,127,007 | B2 * | 11/2018 | Niuwenhuys .......... H04H 60/46 |
| 10,248,378 | B2 * | 4/2019 | Nieuwenhuys ....... H04N 21/812 |
| 10,318,579 | B2 * | 6/2019 | Brenner ................ G06F 16/683 |
| 10,868,846 | B2 * | 12/2020 | Mocioiu ............... H04L 67/306 |
| 10,880,322 | B1 * | 12/2020 | Jakobsson ............... H04L 51/08 |
| 10,992,726 | B2 * | 4/2021 | Niuwenhuys ........... H04L 67/12 |

(Continued)

*Primary Examiner* — Eleni A Shiferaw
*Assistant Examiner* — Hassan A Hussein
(74) *Attorney, Agent, or Firm* — Fenwick & West LLP (57) ABSTRACT

A method comprises receiving a session identifier from a streaming system that identifies a user session with the streaming system. The method further includes receiving a first message from a streaming system that is based on a token that is generated based on a combination of the session identifier and a timestamp at which an insertable content item was presented to the user in a content stream by the streaming system. The first message is decrypted using a plurality of timestamps that are within a range of a current time. An identifier is determined for the insertable content item based on the decrypted message. A second message is transmitted to an enabling system, the message including instructions for execution by the enabling system to execute one or more operations with the identified insertable content item.

14 Claims, 4 Drawing Sheets

(56) References Cited

U.S. PATENT DOCUMENTS

| | | | |
|---|---|---|---|
| 2010/0088236 A1* | 4/2010 | Karabulut | G06F 21/335 |
| | | | 705/59 |
| 2012/0054491 A1* | 3/2012 | Tippett | H04L 9/3213 |
| | | | 713/168 |
| 2012/0146773 A1* | 6/2012 | Gallo | H04L 9/0877 |
| | | | 340/10.42 |
| 2015/0067328 A1* | 3/2015 | Yin | H04L 63/0807 |
| | | | 713/168 |
| 2016/0171540 A1* | 6/2016 | Mangipudi | G06Q 30/0255 |
| | | | 705/14.53 |
| 2018/0025145 A1* | 1/2018 | Morgner | H04L 63/045 |
| | | | 726/4 |
| 2018/0255036 A1* | 9/2018 | Fiedler | H04L 63/045 |
| 2018/0351741 A1* | 12/2018 | Kim | H04L 9/0819 |
| 2019/0058745 A1* | 2/2019 | Mocioiu | H04L 67/306 |
| 2019/0289017 A1* | 9/2019 | Agarwal | H04L 9/12 |
| 2020/0028847 A1* | 1/2020 | Mizuno | H04W 12/06 |
| 2020/0034521 A1* | 1/2020 | Teng | H04L 63/083 |
| 2020/0128086 A1* | 4/2020 | Lewis | G06F 16/9554 |
| 2020/0153631 A1* | 5/2020 | Carey | G07C 9/27 |
| 2020/0195439 A1* | 6/2020 | Suresh | H04L 9/3213 |
| 2020/0366754 A1* | 11/2020 | Wang | H04L 67/60 |
| 2020/0382275 A1* | 12/2020 | Mocioiu | H04L 9/0866 |
| 2021/0211271 A1* | 7/2021 | Kuang | H04L 9/3239 |

\* cited by examiner

DECOUPLED CUSTOM EVENT SYSTEM BASED ON EPHEMERAL TOKENS FOR ENABLING SECURE CUSTOM SERVICES ON A DIGITAL AUDIO STREAM

CROSS REFERENCE TO RELATED APPLICATION

This application claims the benefit of EP Application 19464009.0, filed May 30, 2019, which is incorporated by reference in its entirety.

TECHNICAL FIELD

The disclosure generally relates to the field of real-time audio processing, and specifically to decoupled custom event system based on ephemeral tokens for enabling secure custom services on a digital audio stream.

BACKGROUND

Most services available on the Internet require the communication between multiple entities. This creates an issue of data security and privacy, as the sharing of data between these multiple entities, over the unsecured Internet, may allow a malicious attacker to gather information from the communications between entities regarding the users who use the services provided by those entities. If the communications includes personally identifiable information, this information can be gathered by the malicious attacker in order generate a composite profile of users of a service. Even if the communications does not include any personally identifiable information, a malicious attacker can still infer information from the communications that may lead to identification of particular users and their actions. For example, two services that communicate using unchanging user identifiers, even though those identifiers are randomly generated, would allow an attacker to infer the activities of individual users by tracking their user identifiers across sessions, and potentially link a user identifier with a user using external information. In addition, the more services which store personally identifiable information for the user, the higher the likelihood that the user's information is compromised as an attacker has more targets to attack when trying to extract the personally identifiable information.

Thus, the security of information that is communicated between services, as well as that information which is stored with different services, is of significant importance. This information must be adequately protected against attackers. This has become even more important as new legislation (e.g., the General Data Protection Regulation of the European Union) mandate more stringent data protection laws carrying harsh penalties for any violations. Therefore, what was lacking, inter alia, was an ability to reduce the footprint of information stored at different services, as well as securing communications between services that occur over unsecured networks such that an attacker cannot gleam any information through these communications that would lead to compromise of personally identifiable information.

SUMMARY

Embodiments of the current disclosure comprise a method for receiving a session identifier from a streaming system, with the session identifier identifying a user session with the streaming system. The method further comprises receiving a token from a streaming system, the token including a hash based on a combination of the session identifier and a timestamp at which an insertable content item was presented to the user by a streaming system. The system decrypts the hash of the token using a plurality of timestamps within a range of a current time, and determines an identifier of the insertable content item presented to the user based on the decrypted hash. For example, the system may determine a range of timestamps within five minutes of the current time, and attempt to generate a hash matching the hash from the token using the known session identifier using the determined timestamps. Only a single timestamp can generate a hash matching the token. With the single timestamp, the content that was presented to the user during that timestamp may be determined. As another example, the token may be used to encrypt an identifier of the insertable content item. By testing different hashes that are combinations of the session identifier and one of the determined timestamps, one of the different hashes is able to decrypt the identifier of the content item into a readable value in order to identify the insertable content item. In addition, the system transmits a message to an enabling system that includes instructions for execution by the enabling system to execute one or more operations with the identified insertable content item.

Exemplary advantages of such a system include the ability to isolate the system that processes the personal information of a user, instead of having that information be transmitted amongst various systems. While the system that handles personal information is isolated, this does not mean that this system must handle all activities related to the actionable content items. Instead, this can be provided by a separate system. This delegation of services allows for a more streamlined delivery of streaming content and interactive media. Furthermore, as the information is passed via a token that is hashed, a malicious attacker cannot determine any information about content that is presented to the user using the token. In addition, as the user is only identified via a session identifier which changes per session, the user cannot be identified across sessions. The timestamp is also ephemeral, and cannot be used later to recover additional information about the user.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example environment for a decoupled custom event system based on ephemeral tokens for enabling secure custom services on a digital audio stream, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System

Figure 1:
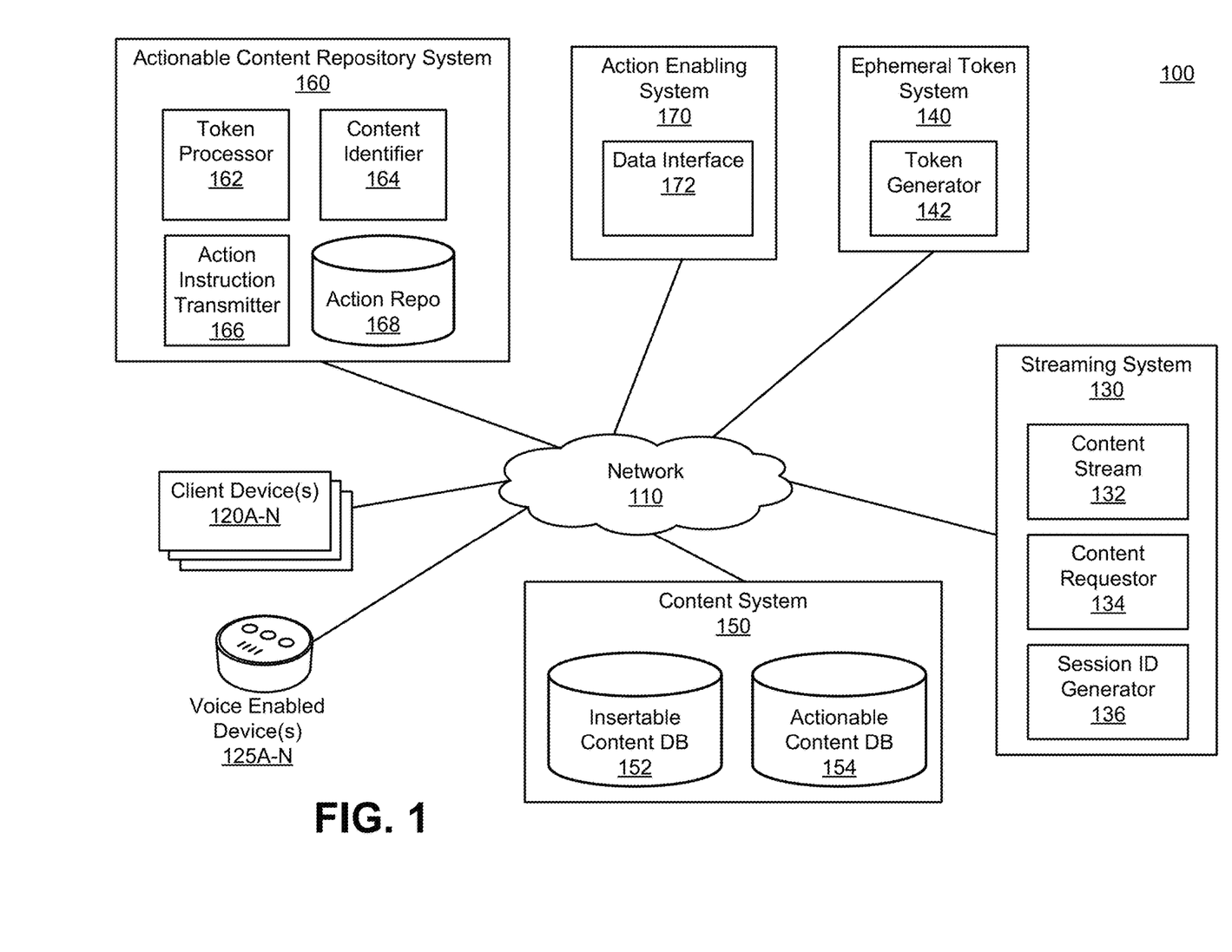

Figure (FIG. 1 illustrates an example environment for a decoupled custom event system based on ephemeral tokens for enabling secure custom services on a digital audio stream, according to an embodiment. The environment 100 includes a network 110, client device(s) 120, voice enabled device(s) 125, streaming system 130, ephemeral token system 140, content system 150, actionable content repository system 160, and action enabling system 170. Although the illustrated environment 100 may include the elements shown in FIG. 1, in other embodiments the environment 100 may include different elements. Furthermore, the functionalities of each element may be distributed differently among the elements in other embodiments. Each of the devices and systems described in FIG. 1 may be implemented using one or more of the components described below with reference to FIG. 4.

Network

The network 110, which can be wired, wireless, or a combination thereof, enables communications among the components of the environment 100, and may include the Internet, a local area network (LAN), virtual LAN (VLAN) (e.g., with VPN), wide area network (WAN), or other network. In one example embodiment, the network 110 uses standard communications technologies and/or protocols, such as Hypertext transfer Protocol (HTTP), Secure Hypertext transfer Protocol (HTTPS), Secure Sockets Layer (SSL), Transport Layer Security (TLS), Transmission Control Protocol/Internet Protocol (TCP/IP), Uniform Resource Locators (URLs), and the Domain Name System (DNS). In another example embodiment, the entities can use custom and/or dedicated data communications technologies instead of, or in addition to, the ones described above.

Client Device(s) and Voice Enabled Device(s)

The client devices 120A-N (referred to herein generally as client devices 120) are electronic devices used by users to perform functions such as consuming digital content, executing software applications, browsing websites hosted by web servers on the network 110, downloading files, receiving and present content items, such as digital audio, and so on. The client devices 120 may be dedicated e-readers, smartphones, wearables (e.g., smartwatches or pendants), or tablets, laptops, vehicle infotainment system, or desktop computers configured similar to an exemplary machine (or computing system) described below with reference to FIG. 4. In one embodiment, the client devices 120 present digital audio streamed from the streaming system 130, and present content items received from the content system 150.

The voice enabled devices 125A-N (referred to herein generally as voice enabled devices 125) are client devices that receive input from users and generate output via sound. Thus, each voice enabled device 125 includes one or more sound input components, such as a microphone, in order to receive sound input, and one or more sound output devices, such as a speaker, in order to generate sound output. The voice enabled devices 125 may communicate over the network 110 with the other elements of the system 100. For example, the voice enabled devices 125 may receive streaming digital audio from the streaming system 130, and insertable content items for presentation via the content system 150. The voice enabled devices 125 may also receive data for presentation from the action enabling system 170, and transmit information in response back to the action enabling system 170.

In one embodiment, the client devices 120 and the voice enabled devices 125 include a content presenter. This may be a software application executing on each client device 120 or each voice enabled device 125, or may be a hardware component, such as a dedicated audio co-processor. The content presenter may submit requests for streaming content from the streaming system 130. This may include streaming audio and/or streaming video. The content presenter may also request a selection of content streams (e.g., via a search) from the streaming system 130 and select one of these streams based on input from a user. The selected content stream is presented to the user by the content presenter after receiving the content stream from the streaming system 130. The content presenter may also receive content items from the content system 150 for presentation to the user. These content items may be selected by the content system 150 upon request by the streaming system 130, and are described in further detail below.

Streaming System

The streaming system 130 may be configured to transmit content streams, such as content stream(s) 132, to destination systems, such as the client devices 120 and the voice enabled devices 125. The content stream 132 may be live (e.g., transmitted to the destination systems in real-time or near real-time, such as within a delay of 1 second). The content stream 132 that is transmitted by the streaming system 130 may be created at the streaming system 130, or may be received from one or more publishers (e.g., podcast creators, digital radio stations, video producers, content aggregation sites, etc.). The content stream 132 is transmitted by the streaming system 130 to the destination systems as a stream, i.e., only a portion of the content from the content stream is transmitted to the destination system before the destination system begins playback or presentation of the content in the content stream. The content stream 132 may be in any format capable of being streamed in real-time, such as MP3 or AAC. The streaming system 130 may transmit the content stream 132 along with metadata, such as a description of the content within the content stream 132, a program or content guide, technical specifications (e.g., format, bit rate), content author, and so on. In one embodiment, instead of transmitting a content stream, the streaming system 130 transmits entire content files to destination systems, and the destination systems are able to play these files after they are fully received.

The streaming system 130 also includes a session identifier (ID) generator 136. The session ID generator 136 generates a session ID for each user session from a client device 120 or voice enabled device 125 that requests a connection with the streaming system 130 in order to receive the content stream(s) 132. The session ID generator 136 generates a unique identifier for the session established by that connection. The session ID generator 136 may be generated randomly such that it cannot be traced back to the user of the associated session during another session. Therefore, the session ID generator 136 may generate the session ID without basing it on any uniquely identifiable information for the user, such the user's client device ID. In this way, the session ID can only be traced back to a single session. Once the session is ended, the session ID is discarded. The session ID generator 136 may generate a session ID by generating a sufficiently long string of random values. The length of the string may depend upon the expected number of sessions that may be received over a given time period. The session ID length is chosen such that the random generation of the session ID string does not result in the same session ID being generated more than a certain likelihood over the given time period (e.g., 0.01% over 1 year period). After generating the session ID, the session ID generator 136 may transmit the session ID to the actionable content repository system 160.

The streaming system 130 may include a content requestor 134 to request insertable content items from the content system 150 for insertion into a content stream 132. These insertable content items may be sponsored by a third party or may be related to the content stream 132 being presented. In addition, these insertable content items may be actionable. This means that a user can respond to the presentation of the insertable content item with some action that can be recorded and transmitted to a destination system. As the insertable content items that are inserted may change each time the same content stream 132 is presented, or may change based on the user that is presented with the content stream 132, these content items are not included with the content stream 132 and are stored separately. The content requestor 134 may provide the content system 150 with set of requirements, and the content system 150 may find a set of matching insertable content items that meet those requirements for transmission to the content requestor 134. Alternatively, the content system 150 may select an exact number of insertable content items for transmission to the content requestor 134 that match the number of insertable content items that were specified in the request by the content requestor 134. Additional details regarding the content system 150 are described below. If the content requestor 134 receives multiple insertable content items, the content requestor 134 selects one or more insertable content items for insertion into the content stream 132 based on various characteristics of the insertable content items, such as value received for the insertable content item, compatibility of the insertable content item with characteristics of the user that is to be presented with the insertable content item, and so on. For example, the content requestor 134 may determine that the user being presented with the content stream 132 has certain characteristics (e.g., within a certain demographic, within a geographic region, etc.). The insertable content item that is selected may also be based on the type of client device that the user is using to receive the content stream 132. The insertable content item may be selected such that it is compatible with the features of the client device. For example, if the user is using a sound only voice enabled device, the insertable content item that is selected may be audio only, and if the insertable content item is actionable, then only those actionable content items with actions that can be performed by voice may be selected. The content requestor 134 will thus insert insertable content items into the content stream 132 that are selected for users with those characteristics. Alternatively, if the number of insertable content items exactly matches the number of items requested, the content requestor 134 inserts all of these insertable content items into the content stream 132. The content requestor 134 may insert the insertable content items into the content stream at certain digital or audio markers within the content stream 132, or may insert them periodically or after a duration. After inserting the insertable content item(s), the content requestor 134 may receive a response or other indicator from the client device indicating any action performed by the user in response to the insertable content item, in the case where the insertable content item is actionable.

After, before, or during the insertion of the insertable content item, the content requestor 134 may further request a token from the ephemeral token system 140. To do this, the content requestor 134 transmits to the ephemeral token system 140 the session ID for the user session of the user who is receiving the content stream 132 that the insertable content item to be inserted. The content requestor 134 also transmits the timestamp at which the insertable content item was presented to the user. This may be the timestamp at which the content requestor 134 inserted the insertable content item, the timestamp at which the presentation of the insertable content item completed playback, or some other timestamp related to the insertable content item. In response, the content requestor 134 receives from the ephemeral token system 140 a token. The content requestor 134 may transmit this token to the actionable content repository system 160, or may use the token to encrypt an identifier of the insertable content item(s) inserted into the content stream 130. This encrypted indicator may be sent to the actionable content repository system 160. The content requestor 134 may also encrypt with the identifier of the insertable content item a flag indicating whether the insertable content item that was presented to the user was actioned upon, i.e., whether the user actually responded to the presentation of the insertable content item with an action, in the case of an actionable insertable content item. Additional details regarding both the ephemeral token system 140 and the actionable content repository system 160 are described below.

Ephemeral Token System

The ephemeral token system 140 generates tokens based on a hash of a session ID and a timestamp received from the streaming system 130 for a particular user session for which the streaming system 130 is transmitting the content stream 132. The ephemeral token system 140 may be part of the same organization as the streaming system 130. The ephemeral token system 140 includes a token generator 142 to generate the token. In one embodiment, the token generator 142 receives a timestamp in UNIX time format from the streaming system 130. The token generator 142 also receives the session ID. The token generator 142 may concatenate (or combine using some other method) these two values together and hash them, e.g., by a non-cryptographic hash function such as MurmerHash. After generating the hash, the token generator 142 may transmit this hash back to the streaming system 130 as the token. Both the receipt of the session ID and timestamp and the transmission of the token may be encrypted using some cryptographic protocol such as SSL such that a malicious attacker cannot extract any generated tokens.

Content System

The content system 150 provides the insertable content items to the streaming system 130 upon request. These insertable content items may be regular insertable content items for which a user cannot respond to with an action, or may be actionable insertable content items for which a user can respond to with an action. The content system 150 may store these insertable content items in separate databases, such as the insertable content database (DB) 152 and the actionable content DB 154. Each insertable content item may be stored with various metadata, such as its publisher, duration, and various characteristics that may be used to match the insertable content item to particular users, as described above with reference to the content requestor 134. While the streaming system 130 may match an insertable content item to a user as described above, the content system 150 may perform the same task and match an insertable content item(s) to a user based on characteristics of that user received from the streaming system 130. The content system 150 may transmit the matched insertable content items to the streaming system 130. In another embodiment, instead of transmitting the matched insertable content items to the streaming system 130, the content system 150 directly inserts these content items into a content stream 132 that is being presented at the client device.

In addition, each actionable content item in the actionable content DB 154 may include metadata regarding the type of action(s) that can be performed in response to the presentation of that actionable content item. For each of these actions, the actionable content DB 154 may store instructions regarding how to detect that action (e.g., a detectable sound pattern, input pattern), instructions regarding additional input to request from the user, and instructions regarding how to complete the request associated with the action (e.g., execute a function, acquire a product or service).

For example, an actionable content item may include a sound file which prompts the user regarding a calendar entry. The responses for that actionable content item may be to reschedule the calendar entry, stop the reminder, or to provide more details. The instructions stored with this actionable content item includes instructions to detect the three different responses, for example, by instructing the streaming system 130 to request a sound input from the client device, and to perform speech recognition on a received sound from the client device to determine the words spoken by the user. The instructions further instruct the streaming system 130 to match the spoken words with one of the possible responses. For each response, the actionable content DB 154 further includes instructions to cause the streaming system 130 or other destination system, such as the action enabling system 170, to execute the actions corresponding to the specified response.

Additional details regarding the action enabling system 170 are described below. In one embodiment, the content system 150 is combined with the actionable content repository system 160.

Actionable Content Repository System

The actionable content repository system 160 receives the anonymized token or encrypted message from the streaming system 130 and determines whether any instructions need to be executed in response to any responses received for any actionable content item that is inserted into the content stream 132 and presented to the user of a client device 120 or voice enabled device 125. The actionable content repository system 160 includes a token processor 162, a content identifier 164, an action instruction transmitter 166, and an action repository 168.

The token processor 162 receives either the token or a message encrypted with the token from the streaming system 130 after an insertable content item has been presented to the user in the content stream 132. In the case where the token processor 162 receives the token directly, the token processor may generate a number of hashes using combinations of the session ID for the current user associated with the token, and a number of different timestamps. The timestamps that are chosen are the timestamps which are within a period of time of the current time (e.g., ±5 mins). The token processor 162 generates hashes until a hash with a combination of the session ID and selected timestamp that is generated matches the token. The token processor 162 uses the same hash function that was used by the token generator 142 of the ephemeral token system 140, and combines the session ID and timestamp in the same fashion as the token generator 142. If the token processor 162 does not know the session ID for which the token was generated from (e.g., in the case where there are multiple sessions), the token processor 162 may generate hashes with a combination of different timestamps (which are within the period of time) and all active session IDs. As the hashing function that is selected is computationally efficient, the generation of the hashes is not resource intensive. Only one combination of session ID and timestamp will have a hash that matches the hash of the token. Once the hash is matched, the timestamp (and session ID) that were used to generate the hash are sent to the content identifier 164.

In another embodiment where the token processor 162 receives an encrypted message that was encrypted with the token, the token processor 162 performs a similar operation as in the case where the token processor 162 receives the token itself. The token processor 162 generates multiple hashes based on combinations of the session ID and timestamp, testing multiple session IDs if necessary. The token processor 162 attempts to use each generated hash to decrypt the message to see if a comprehendible result is generated. A comprehendible result is a result that includes data that matches an expected format. In this case, the expected format may be that of an identifier of an insertable content item and an actioned flag indicating whether the content item was actioned upon. The identifier of the content item and the actioned flag may be in a specific format which has a length or other characteristic which would make it unlikely to be randomly chanced upon. For example, the identifier may have a specific prefix or code that would not be correctly decrypted if the wrong hash was used. Thus, unless the hash is determined correctly, the decrypted message will not be in the specific format, and therefore the token processor 162 knows that the hash is not correct. Once the correct hash is determined, the extracted identifier for the insertable content item is sent to the content identifier 164 along with the actionable flag and the session ID and timestamp used to generate the correct hash.

The content identifier 164 identifies the insertable content item that was presented to the user and which is identified using the information received by the token processor 162 (either the token itself or the encrypted message). In the case where the token processor 162 provides a timestamp and session ID to the content identifier 164, the content identifier 164 determines the insertable content item that was presented to the user using the timestamp. The content identifier 164 receives from the streaming system or content system 150 a list of insertable content items that were presented to different session IDs at different timestamps. Using this information, the content identifier 164 can match the timestamp and session ID provided by the token processor 162 with the entry in the list, in order to determine the insertable content item that was presented to the user. Upon identifying the insertable content item, the content identifier 164 further determines if the insertable content item is an actionable content item. The content identifier 164 may request this information from the content system 150, or this information may be stored in the action repository 168. Upon determining that the insertable content item is not an actionable content item, the content identifier 164 may stop operation. However, if the content identifier 164 determines that the insertable content item is an actionable content item, the content identifier 164 further determines if the actionable content item was actioned upon. The content identifier 164 or token processor 162 may receive a flag from the streaming system 130 indicating whether the insertable content item was actioned upon. If the flag indicates that the content item was actioned upon, the content identifier 164 sends this information, along with an identifier of the content item and session ID to the action instruction transmitter 166. Otherwise, the content identifier 164 stops further operation. The flag may not only indicate that the actionable content item was actioned upon, but also which action was performed by the user in the case where multiple actions may be made in response to the actionable content item.

In the case where the token processor 162 received an encrypted message, the content identifier 164 receives from the token processor 162 the session ID, identifier of the insertable content item, and the actionable flag indicating the type of action that was performed by the user in response to the insertable content item or that no action was performed. The content identifier 164 identifies the insertable content item using the identifier of the insertable content item, and if the actionable flag indicates that an action was performed, the content identifier 164 sends the actionable flag, identifier of the insertable content item, and session ID to the action instruction transmitter 166.

The action instruction transmitter 166 receives information from the content identifier 164 regarding a specific action (specified by the actionable flag) performed by a user with a specific session ID in response to being presented with an actionable content item (indicated by the identifier of the insertable content item) and determines any additional instructions necessary to carry out the request associated with the action. These instructions may be to gather more information from the user, to request that the user input data (via voice, conventional input or otherwise), to execute various computer-readable instructions, to perform a transaction, or any other instruction capable of being executed by a processor. The specific instruction(s) depend upon the actionable content item that was responded to. These instructions may be stored in the action repository 168 (or retrieved from the actionable content DB 154). The action instruction transmitter 166 identifies the correct instructions from the action repository 168 by looking up the identifier of the insertable content item in the action repository 168 and further filtering by the type of action that was performed, if necessary. The result is the set of instructions. After locating these instructions, the action instruction transmitter 166 transmits the instructions to the action enabling system 170 in order to fulfil the response associated with the action performed by the user.

Action Enabling System

The action enabling system 170 executes the instructions received from the action instruction transmitter 166 of the actionable content repository system 160. As the instructions may require the collection of personal information of the user, the isolation of the action enabling system 170 from the remaining systems allows it to be the only system that may access personal information of the user, instead of all the other systems, such as the actionable content repository system 160, also having access to sensitive information of the user. The action enabling system 170 executes the instructions, which are specific to the actionable content item, to perform the desired request. This request may further require additional input to be provided by the user. The action enabling system 170 may request this input via data interface 172, which may interface with a client device of the user via a variety of interfaces such as web, voice, virtual reality, API (application programming interface), and so on. The action enabling system 170 may progress through multiple rounds of communication with the user in order to retrieve the requested information, or to perform the steps of some algorithm with the user (e.g., to allow the user to set a new calendar entry). After receiving any necessary information from the user, the action enabling system 170 may further execute instructions directed at other third parties. These may include other servers, service providers, marketplaces, subscription services, and so on. For example, the user may perform an action indicating that the user wishes to request a reservation at a restaurant. In order to fulfill the request associated with this action, the action enabling system 170 may transmit a message to an API of a restaurant reservation system to attempt to secure the reservation. In addition, the action enabling system 170 may request additional information regarding the reservation from the user, e.g., via a web or voice interface. In one embodiment, the action enabling system 170 is combined with the actionable content repository system 160.

Example Transactional Diagram

Figure 2:
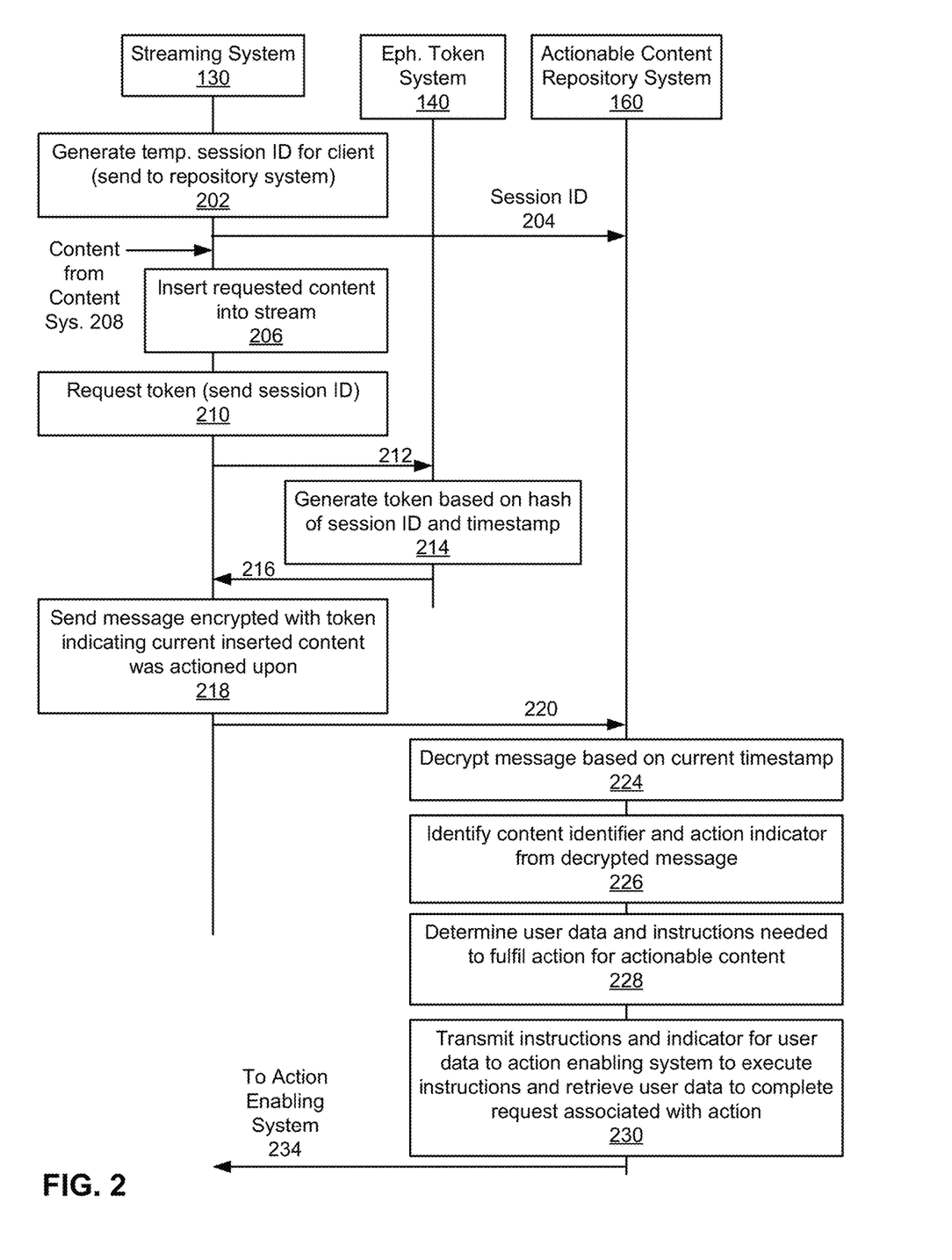
FIG. 2 is a transactional diagram for a system supporting a decoupled custom event system based on ephemeral tokens for enabling secure custom services on a digital audio stream, according to one embodiment.

FIG. 2 is a transactional diagram for a system supporting a decoupled custom event system based on ephemeral tokens for enabling secure custom services on a digital audio stream, according to one embodiment. In some embodiments the steps may be performed in parallel, in different orders, or with different steps may be performed. Also, it is noted that in one example embodiment the steps and/or modules may be embodied as instructions, e.g., instructions 424, that may be executed by the processor 402 described with respect to FIG. 4. The transactional diagram illustrates the streaming system 130, ephemeral token system 140, and the actionable content repository system 160 and omits the other elements in environment 100 for sake of clarity. However, the illustrated systems may also communicate with the other elements in environment 100, such as sending content to the client devices 120.

As illustrated, the streaming system 130 generates 202 a temporary session ID for the client device for a newly initiated client session for streaming a content stream (e.g., content stream 132) to the user. This session ID 204 is sent to the actionable content repository system 160. Once the session terminates, the streaming system 130 may also send a message to the actionable content repository system 160 to remove the session ID from a list of active session IDs. The session ID 204 may be sent in plaintext or encrypted to prevent a malicious attacker from being able to sniff communications between the streaming system 130 and the actionable content repository system 160. Even if the attacker manages to capture the session ID, the information does not reveal anything about the user itself as the session ID is not transmitted to the client device directly here and so cannot be used to locate the client device. Furthermore, the session ID changes for each user session, and so cannot be used to determine a long term connection history for the user.

During the streaming of the content stream, the streaming system 130 may insert 206 an insertable content item requested from the content system 150 (at request 208), in the manner described above. Alternatively, after making the request, the content system 150 itself inserts the insertable content item into the content stream.

The streaming system 130 also requests 210 a token from the ephemeral token system 140. The request 212 is sent to the ephemeral token system 140, which generates 214 the token based on a hash of a timestamp and the session ID. The timestamp may be a current timestamp, or may be a timestamp provided by the streaming system 130 indicating when the insertable content item was provided to the user's client device for presentation, when the insertable content item was presented, or when the presentation of the insertable content item completed. As noted above, the ephemeral content system generates the token as a hash using a combination of the session ID and timestamp. The hash function that is used may be MurmurHash, or any other fast hashing function. The communications between the streaming system 130 and the ephemeral token system 140 may be encrypted.

The streaming system 130 receive the message 216 containing the token. The streaming system also receives an input from the client device indicating that the insertable content item was actioned upon, as it was an actionable content item. The action may be of a specific type (as the insertable content item may allow multiple types of actions. Using the token, the streaming system 130 encrypts a message containing an identifier of the content item that was transmitted to the user as well as a flag indicating the type of action performed by the user in response to being presented with the actionable content item. This encrypted message 220 is transmitted to the actionable content repository system 160 for further processing.

In another embodiment, as described above, the streaming system 130 sends the token directly to the actionable content repository system 160. This token may be encrypted as well before being sent. If only the token is sent over, the streaming system 130 may also send over a list of timestamps and identifiers of content items that were presented during these timestamps to users with sessions with the streaming system 130. This information may not be able to be used to individually identify users as it includes timestamps for all sessions. The streaming system 130 may also send over a flag indicating whether the user performed an action against the insertable content item if the insertable content item was an actionable content item.

In yet another embodiment, if the content system 150 inserts the insertable content item into the content stream, then the content system 150 may receive the response from the client device regarding the action performed by the user, and the content system may send the encrypted message or the token to the actionable content repository system 160.

Upon receiving the message 220 with the encrypted identifier of the content item and the actionable flag, the actionable content repository system 160 decrypts 224 the message based on the current timestamp. As described above, the actionable content repository system 160 may select multiple timestamps within a time period (e.g., 5 mins) of the current timestamp. The actionable content repository system 160 uses the same hashing algorithm that was used to generate the token in order to generate hashes based on these selected timestamps and the session ID. If the session ID is provided by the streaming system 130 along with the message 220 (and is not encrypted by the token), the actionable content repository system 160 can use this session ID in combination with each selected timestamp and generate a hash based on this combination. Otherwise, the actionable content repository system 160 may generate timestamps based on the currently active session IDs which have been received from the streaming system 130. The actionable content repository system 160 further uses the generated hash to decrypt the message 220. Only one hash will be able to decrypt the message as the combination of session ID and timestamp will be unique. The actionable content repository system 160 can determine that the decryption is successful when the decrypted message matches a specific format. The actionable content repository system 160 can then extract the identifier of the insertable content item and the actionable flag from the decrypted message.

In this manner, any identifier of the insertable content item that is linked to a user, e.g., via the user's session ID, is not directly transmitted between the streaming system 130 and the actionable content repository system 160. This further prevents an attacker from sniffing or inferring any information regarding the users.

The actionable content repository system 160 identifies 226 the insertable content item that was presented to the user using the identifier of the content item, and determines whether the content item was actioned up using the actionable flag. This can be done by extracting the decrypted identifier and flag from the decrypted message.

Alternatively, if the actionable content repository system 160 receives the token itself instead of an encrypted message, the actionable content repository system 160 can perform the same operation, but simply generates hashes in order to determine which generated hash matches the token itself. Once a matching hash is found, the timestamp used to generate that hash is matched against a list of timestamps associated with identifiers of insertable content items (which may have been received previously). In this manner, the actionable content repository system 160 can also know which insertable content item was presented to the user. As noted, the actionable content repository system 160 may also separately receive an actionable flag in this case indicating whether the content item was actioned upon.

The actionable content repository system 160 determines 228 if any instructions, including instructions to collect user data and to execute any other functions related to the insertable content item, are necessary. The actionable content repository system 160 first determines whether the actionable flag indicates that an action was performed by the user. The actionable content repository system 160 also determines whether the action is associated with any instructions (e.g., stored in the action repository 168). If the user performed an action, and if that action is associated with instructions, the actionable content repository system 160 may compile the instructions into a message and transmit 230 the instructions 234, which may include instructions to collect user data, to the action enabling system 170 to cause the action enabling system 170 to execute the instructions to perform operations related to completing the request associated with the action the action. These instructions may include requesting the additional user data from the user, via an interface, such as a web or voice interface. The user data may include the username of the user, phone number, requesting the user log in to a service, requesting the user answer various queries, and so on. The instructions may cause any user data to be encrypted during transmission. These instructions may also include requesting additional confirmation or input from the user, such as by requesting that the user shake a smartphone device. In one embodiment, the instructions may cause the action enabling system 170 to request information from the streaming system 130. In such a case, the action enabling system may receive the session ID and determined token from the actionable content repository system 160, and encrypt any request using the token before transmitting to the streaming system 130. The transmission may include the session ID in unencrypted form to identify the session being used.

Example Flow

Figure 3:
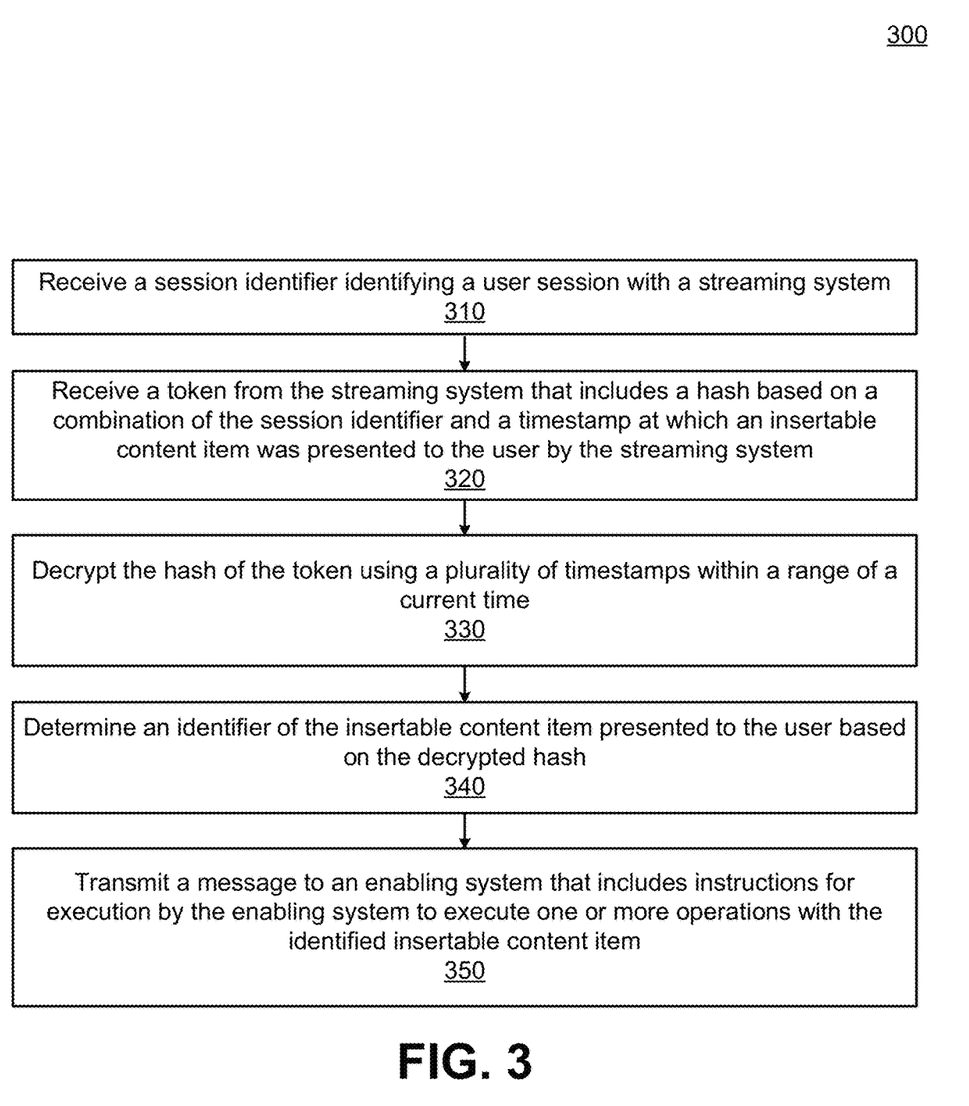
FIG. 3 is a flow chart illustrating an exemplary method for a decoupled custom event system based on ephemeral tokens for enabling secure custom services on a digital audio stream, according to one embodiment.

FIG. 3 is a flow chart 300 illustrating an exemplary method for a decoupled custom event system based on ephemeral tokens for enabling secure custom services on a digital audio stream, according to one embodiment. In one embodiment, FIG. 3 attributes the steps of the flow chart 300 to the actionable content repository system 160. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 424, that may be executed by the processor 402 described with respect to FIG. 4.

The actionable content repository system 160 receives 310 a session identifier identifying a user session with a streaming system (e.g., streaming system 130). The actionable content repository system 160 receives 320 a token from the streaming system that includes a hash based on a combination of the session identifier and a timestamp at which a content item was presented to the user by the streaming system.

Subsequently, the actionable content repository system 160 decrypts 330 the hash of the token using a plurality of timestamps within a range of a current time. The actionable content repository system 160 determines 340 an identifier of the content item presented to the user based on the decrypted hash. The actionable content repository system 160 transmits 350 a message to an enabling system that includes instructions for execution by the enabling system to execute one or more operations with the identified insertable content item.

Example Machine Architecture

Figure 4:
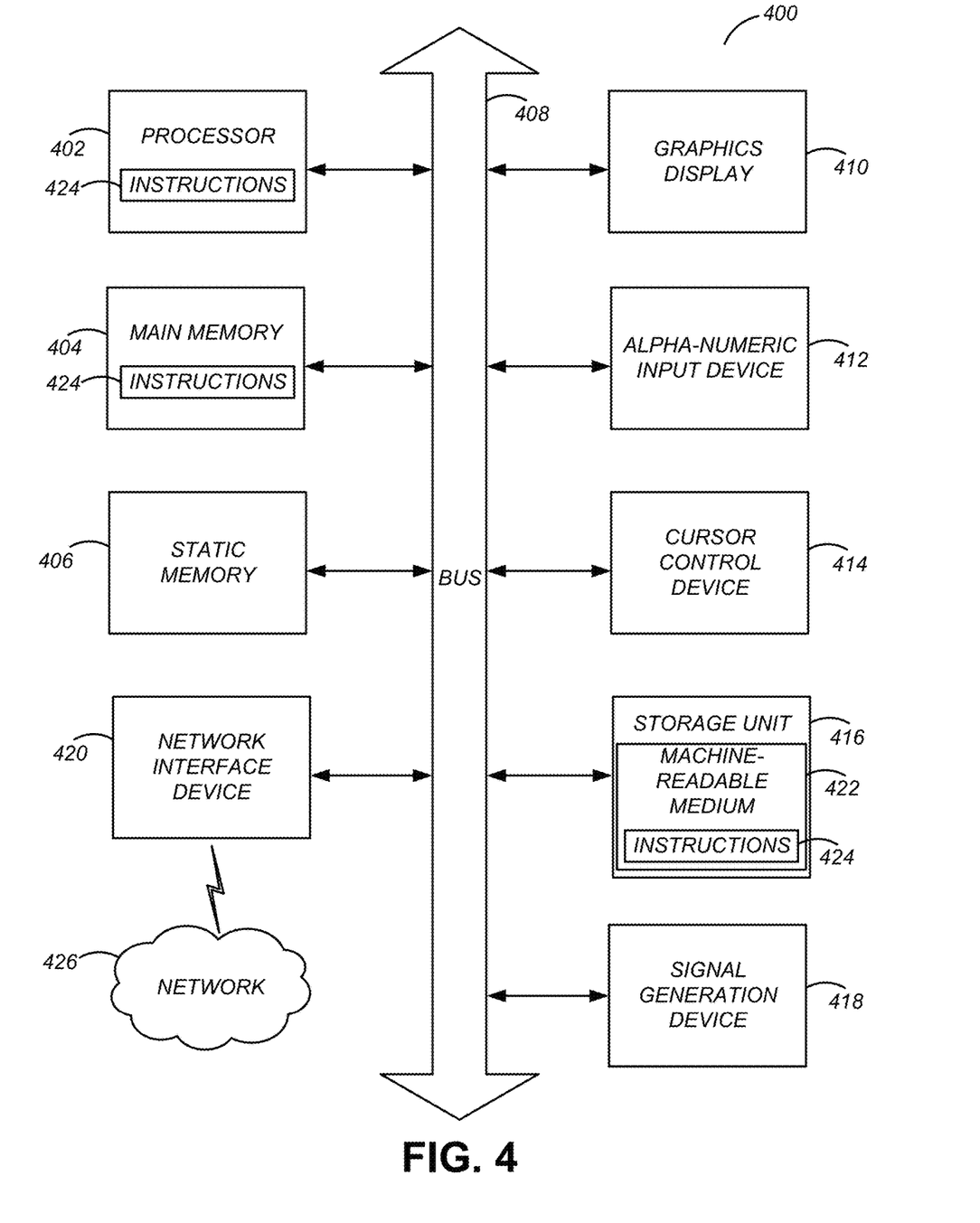
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 400 is used to execute the processes and functionality described in FIGS. 1-3. It is noted that the computer system 400 is exemplary and that not all the components described herein may be necessary to execute the processes as described above.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 416 communicate via a bus 408.

In addition, the computer system 406 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability for a decoupled custom event system based on ephemeral tokens for enabling secure custom services on a digital audio stream. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 402) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 424) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 402 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 404). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a system with a decoupled custom event system based on ephemeral tokens for enabling secure custom services on a digital audio stream through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for securing session data comprising:
   receiving, by a device, a session identifier from a streaming system, the session identifier identifying a user session with the streaming system;
   receiving, by the device, a first message from the streaming system, the first message encrypted based on an ephemeral token that is generated based on a hash of the session identifier and a timestamp at which an insertable content item was presented to the user in a content stream by the streaming system;
   determining, by the device, a range of times that include a current time as indicated by the timestamp;
   generating, by the device, a plurality of different hash values, each different hash value generated by hashing a different timestamp of a plurality of different timestamps with the session identifier, each different timestamp being within the range of times, wherein the plurality of different timestamps within the range of times are used to generate the plurality of different hash values;
   attempting, by the device, to decrypt the first message by comparing each of the plurality of different hash values to a hash of the token;
   determining, by the device, from the comparing, a matching hash value of the plurality of different hash values that matches the hash of the token;
   decrypting, by the device, the first message using the matching hash value;
   extracting, by the device, a session identifier of the insertable content item from the decrypted message; and
   transmitting, by the device, a second message to an enabling system, the second message including instructions for execution by the enabling system to execute one or more operations with the identified insertable content item.

2. The method of claim 1, wherein the one or more operations are associated with an action performed by a user in response to being presented with the insertable content item.

3. The method of claim 2, wherein the user session is initiated by a voice enabled device, and wherein the action is performed by the user using the voice enabled device.

4. The method of claim 1, wherein the session identifier is a randomly generated value that is generated in response to each new user session and discarded after a termination of the user session.

5. The method of claim 1, wherein the token is generated by using a hashing function on the session identifier concatenated with the timestamp.

6. A system comprising:
   one or more processors
   a non-transitory computer readable storage medium comprising stored instructions for securing session data, that when executed by the one or more processors, cause the one or more processors to:
      receive, by a device, a session identifier from a streaming system, the session identifier identifying a user session with the streaming system;
      receive, by the device, a first message from the streaming system, the first message encrypted based on an ephemeral token that is generated based on a hash of the session identifier and a timestamp at which an insertable content item was presented to the user in a content stream by the streaming system;
      determine, by the device, a range of times that include a current time as indicated by the timestamp;
      generate, by the device, a plurality of different hash values, each different hash value generated by hashing a different timestamp of a plurality of different timestamps with the session identifier, each different timestamp being within the range of times, wherein the plurality of different timestamps within the range of times are used to generate the plurality of different hash values;
      attempt, by the device, to decrypt the first message by comparing each of the plurality of different hash values to a hash of the token;
      determine, by the device, from the comparing, a matching hash value of the plurality of different hash values that matches the hash of the token;
      decrypt, by the device, the first message using the matching hash value;
      extracting, by the device, a session identifier of the insertable content item from the decrypted message; and
      transmit, by the device, a second message to an enabling system, the second message including instructions for execution by the enabling system to execute one or more operations with the identified insertable content item.

7. The system of claim 6, wherein the one or more operations are associated with an action performed by a user in response to being presented with the insertable content item.

8. The system of claim 7, wherein the user session is initiated by a voice enabled device, and wherein the action is performed by the user using the voice enabled device.

9. The system of claim 6, wherein the session identifier is a randomly generated value that is generated in response to each new user session and discarded after Men a termination of the user session.

10. The system of claim 6, wherein the token is generated by using a hashing function on the session identifier concatenated with the timestamp.

11. A non-transitory computer readable storage medium comprising stored instructions for securing session data, the instructions that when executed by one or more processors cause the one or more processors to:
    receive, by a device, a session identifier from a streaming system, the session identifier identifying a user session with the streaming system;
    receive, by the device, a first message from the streaming system, the first message encrypted based on an ephemeral token that is generated based on a hash of the session identifier and a timestamp at which an insertable content item was presented to the user in a content stream by the streaming system;
    determine, by the device, a range of times that include a current time as indicated by the timestamp;
    generate, by the device, a plurality of different hash values, each different hash value generated by hashing a different timestamp of a plurality of different timestamps with the session identifier, each different timestamp being within the range of times, wherein the plurality of different timestamps within the range of times are used to generate the plurality of different hash values;

attempt, by the device, to decrypt the first message by comparing each of the plurality of different hash values to a hash of the token;

determine, by the device, from the comparing, a matching hash value of the plurality of different hash values that matches the hash of the token;

decrypt, by the device, the first message using the matching hash value;

extracting, by the device, a session identifier of the insertable content item from the decrypted message; and transmit, by the device, a second message to an enabling system, the second message including instructions for execution by the enabling system to execute one or more operations with the identified insertable content item.

12. The non-transitory computer readable storage medium of claim 11, wherein the one or more operations are associated with an action performed by a user in response to being presented with the insertable content item.

13. The non-transitory computer readable storage medium of claim 11, wherein the session identifier is a randomly generated value that is generated in response to each new user session and discarded after a termination of the user session.

14. The non-transitory computer readable storage medium of claim 11, wherein the token is generated by using a hashing function on the session identifier concatenated with the timestamp.

* * * * *